United States Patent
Saby et al.

(10) Patent No.: US 11,467,889 B2
(45) Date of Patent: Oct. 11, 2022

(54) SYSTEM AND METHOD OF UTILIZING LEGACY APPLICATIONS WITH SECURE MEMORY MEDIUM PORTIONS

(71) Applicant: Dell Products L.P., Round Rock, TX (US)

(72) Inventors: Vinod Parackal Saby, Bangalore (IN); Krishnaprasad Koladi, Bengaluru (IN); Gobind Vijayakumar, Trichy (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/167,726

(22) Filed: Feb. 4, 2021

(65) Prior Publication Data
US 2022/0245004 A1 Aug. 4, 2022

(51) Int. Cl.
   *G06F 9/54* (2006.01)
   *G06F 9/50* (2006.01)
   *G06F 9/445* (2018.01)

(52) U.S. Cl.
   CPC .......... *G06F 9/541* (2013.01); *G06F 9/44526* (2013.01); *G06F 9/5016* (2013.01)

(58) Field of Classification Search
   None
   See application file for complete search history.

(56) References Cited

U.S. PATENT DOCUMENTS

2021/0306304 A1* 9/2021 Hwang ................. G06N 20/00

OTHER PUBLICATIONS

Marcela S. Melara et al., "EnclaveDom: Privilege Separation for Large-TCB Applications in Trusted Execution Environments," Jun. 8, 2020, Cornell University arXiv.org archive, 1907.13245v2, pp. 1-14, retrieved from https://arxiv.org/pdf/1907.13245.pdf on Oct. 14, 2021. (Year: 2020).*

Samuel Weiser et al., "SGXIO: Generic Trusted I/O Path for Intel SGX," Mar. 22, 2017, ACM, pp. 261-268, retrieved from https://dl.acm.org/doi/pdf/10.1145/3029806.3029822 on Oct. 18, 2021. (Year: 2017).*

Wellons, Christopher, "memdig.c" Sep. 16, 2016.

(Continued)

*Primary Examiner* — Chat C Do
*Assistant Examiner* — William C Wood
(74) *Attorney, Agent, or Firm* — McDermott Will & Emery

(57) ABSTRACT

In one or more embodiments, one or more systems, one or more methods, and/or one or more processes may determine that an application executable by a processor of an information handling system is to be executed via an enclave; determine that the application has been compiled without an ability to execute within the enclave; store an enclave application in the enclave; store the application in the enclave; establish communications between the application and the enclave application; receive, by the enclave application, first information from the application in the enclave; call, by the enclave application, a first subroutine outside the enclave based at least on the first information; execute, by the enclave application, a second subroutine inside the enclave, in which the second subroutine receives second information from outside the enclave; and provide, by the enclave application, third information, based at least on the second information, to the application.

20 Claims, 6 Drawing Sheets

(56) References Cited

OTHER PUBLICATIONS

Wellons, Christopher. "How to Read and Write Other Process Memory." Sep. 3, 2016, Retrieved from url: https://nullprogram.com/blog/2016/09/03/.
Salzman, Peter Jay et al. "The Linux Kernel Module Programming Guide." May 18, 2007, ver. 2.6.4.
Wikipedia, "ioctl", retrieved on Nov. 13, 2020, retrieved from url: https://en.wikipedia.org/wiki/Ioctl.

* cited by examiner

SYSTEM AND METHOD OF UTILIZING LEGACY APPLICATIONS WITH SECURE MEMORY MEDIUM PORTIONS

BACKGROUND

Field of the Disclosure

This disclosure relates generally to information handling systems and more particularly to utilizing legacy applications with secure memory medium portions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine that a first application, executable by a processor of a first information handling system, is to be executed via a first enclave; may determine that the first application has been compiled without an ability to execute within the first enclave; may allocate the first enclave in a volatile memory medium of the first information handling system; may store a first enclave application in the first enclave; may store the first application in the first enclave; may establish communications between the first application and the first enclave application; may receive, by the first enclave application, first information from the first application in the first enclave; may call, by the first enclave application, a first subroutine outside the first enclave based at least on the first information; may execute, by the first enclave application, a second subroutine inside the first enclave, in which the second subroutine receives second information from outside the first enclave; and may provide, by the first enclave application, third information, based at least on the second information, to the first application.

In one or more embodiments, the third information may include at least a portion of the second information. In one or more embodiments, the one or more systems, the one or more methods, and/or the one or more processes may further: receive, by the first information handling system and from a second information handling system via a network, a request to execute a second application executable by a processor of the second information handling system; allocate a second enclave in the volatile memory medium of the first information handling system; store a second enclave application in the second enclave; store the second application in the second enclave; establish communications between the second application and the second enclave application; receive, by the second enclave application, fourth information from the second application in the second enclave; call, by the second enclave application, a third subroutine outside the second enclave based at least on the fourth information; execute, by the second enclave application, a fourth subroutine inside the second enclave, in which the fourth subroutine receives fifth information from outside the second enclave; and provide, by the second enclave application, sixth information, based at least on the fifth information, to the second application.

In one or more embodiments, the one or more systems, the one or more methods, and/or the one or more processes may further determine that the second application has been compiled without an ability to execute within the second enclave. In one or more embodiments, the second enclave may be different from the first enclave. In one or more embodiments, the first subroutine outside the first enclave may be associated with an operating system executing on the first information handling system. For example, a driver of the operating system may include the first subroutine.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
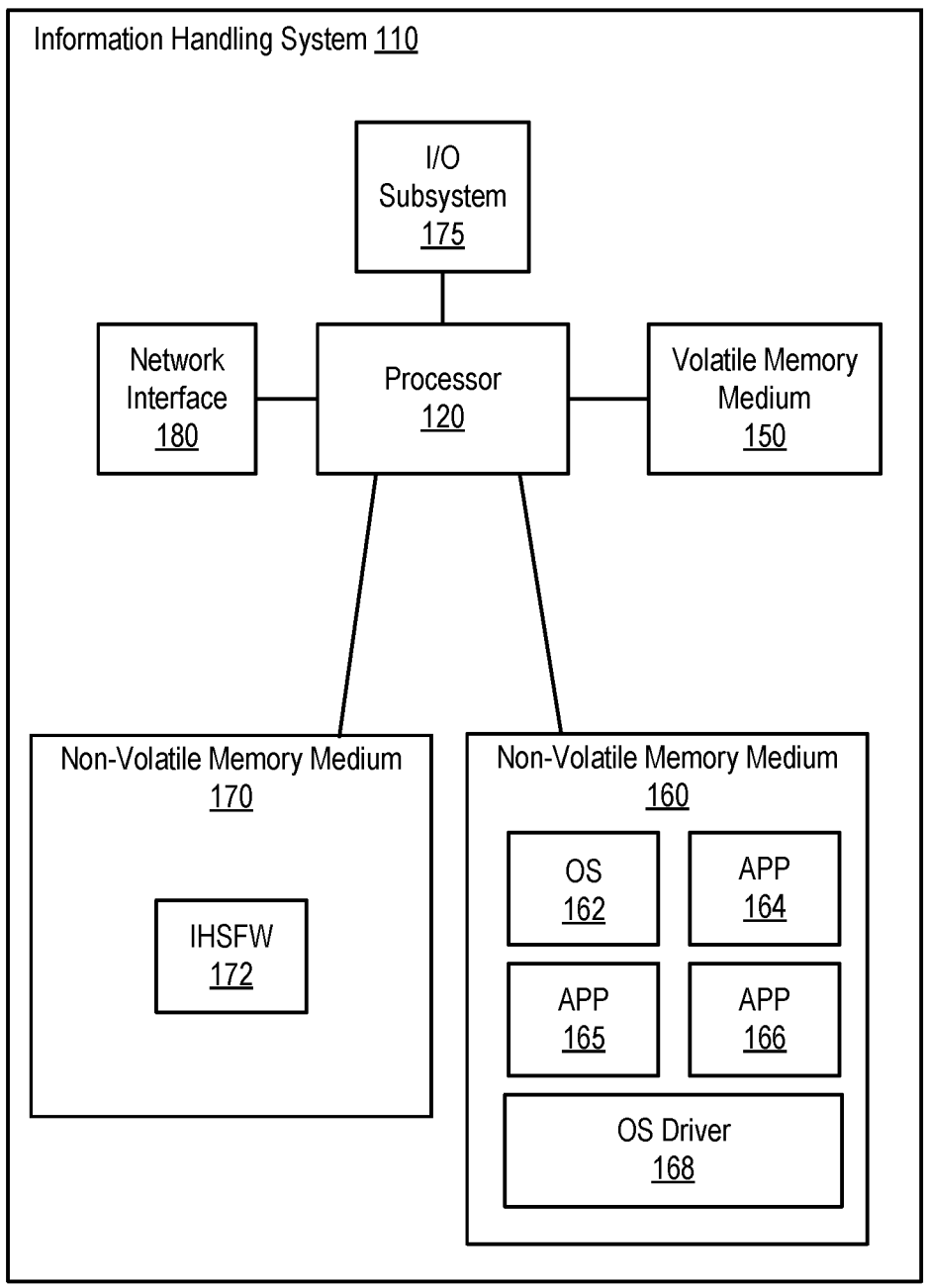
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more systems, one or more methods, and/or one or more processes may isolate and may encrypt processor instructions and data in a memory medium. For example, the one or more systems, the one or more methods, and/or the one or more processes may utilize hardware-based encryption of a portion of the memory medium to isolate and encrypt the processor instructions and the data in the memory medium. For instance, a processor of an information handling system may provide the hardware-based encryption of the portion of the memory medium to isolate and encrypt the processor instructions and the data in the memory medium.

In one or more embodiments, hardware-based encryption may permit user-level processor instructions to allocate one or more private portions of a memory medium. A private portion of the memory medium may be referred to as an enclave. For example, an enclave may protect processor instructions and/or data from being read by and/or from being altered by a process executing at a higher processor privilege level. For instance, an enclave may store application processor instructions (e.g., an application executable by a processor), one or more certificates, one or more private encryption keys, and/or one or more hash values, among others, which should be accessed by authorized operating system processes and/or by authorized processor instructions. In one or more embodiments, the processor of the information handling system may utilize one or more structures and/or one or more functionalities of INTEL® Software Guard Extensions (SGX) to isolate and encrypt processor instructions and/or data in a memory medium. For example, the processor of the information handling system may utilize one or more structures and/or one or more functionalities of INTEL® SGX to create and/or access an enclave. For instance, the processor of the information handling system may include INTEL® SGX.

In one or more embodiments, processor instructions and/or data stored via a memory medium may be subjected to one or more memory medium errors. In one or more embodiments, one or more systems, one or more methods, and/or one or more processes may correct the one or more memory medium errors. In one or more embodiments, if the processor instructions and/or the data are stored via an enclave, the one or more systems, the one or more methods, and/or the one or more processes may not be able to correct a memory medium error associated with the enclave. For example, even though an enclave may provide built-in security to protect information, an enclave may not provide fault resiliency against memory medium related uncorrectable errors, which may result in data loss or data corruption of data stored via an enclave. In one or more embodiments, one or more advanced reliability and security (ADV RAS) features may be disabled in information handling system firmware when an enclave is utilized, which may prevent memory medium mirroring capabilities such as a fault resiliency mode (FRM).

In one or more embodiments, in a full memory medium mirroring mode, sizes listed in a processor reserved memory range register (PRMRR) size option in an information handling system firmware configuration may be adjusted. In one or more embodiments, in a partial memory medium mirroring mode, a PRMRR mirroring option in an information handling system firmware configuration may determine if processor reserved memory range registers (PRMRRs) are in a mirrored region or not. In one or more embodiments, all PRMRRs may be in mirrored regions or no PRMRRs may be in mirrored regions. In one or more embodiments, a total size of a protected memory medium may depend on a number of PRMRRs created in an information handling system. In one or more embodiments, one or more memory medium regions associated with an enclave associated with an application may be fault resilient throughout a life cycle of the application. For example, the fault resiliency may be based at least on an enclave policy (e.g., enclave fault resiliency).

In one or more embodiments, a number of memory medium regions in a PRMRR may be based at least on: if non-uniform memory access (NUMA) is disabled, then utilizing enclaves may be disabled; if NUMA is enabled, a sub NUMA cluster (SNC) may be disabled and a PRMRR for each processor socket may be created (e.g., for a two processor socket information handling system, with NUMA enabled and SNC disabled, two PRMRR regions may be created); and/or if NUMA is enabled and SNC is enabled, then a PRMRR region may be created per SNC. In one or more embodiments, enclave fault resiliency (EFR) may include a software defined enclave memory fault protection service. For example, a user (e.g., an administrator) may spawn an application and may set an EFR attribute, which notes fault resiliency is expected for all the enclaves created by the application.

In one or more embodiments, one or more implementation of a software-defined policy may vary for different applications. In one example, an application may be executed on a virtual machine (VM). In a second example, the application may be executed on a container (e.g., operating system virtualization). In another example, the application may be executed on "bare metal". For instance, when the application may be executed on "bare metal", the application may be executed on an information handling system, without being executed via operating system virtualization and without being executed via a VM.

In one or more embodiments, the application may define trusted and untrusted components utilizing an enclave calls (ECALLs) and outside calls (OCALLs), respectively. For example, an enclave may communicate outside itself. In one instance, an application may invoke a subroutine (e.g., a function) inside the enclave, which may pass parameters and/or pointers to shared memory within the application. As an example, the invocations of the subroutine inside the enclave may be referred to as an enclave call (ECALL). In a second instance, when an enclave executes, the enclave may perform invoke a subroutine (e.g., a function) in the application. As an example, the invocations of the subroutine outside the enclave may be referred to as an outside call (OCALL). Different from an ECALL, an OCALL may not share enclave memory with the application, according to one or more embodiments. For example, parameters may be copied into application memory before the OCALL may be performed. In another instance, execution may exit an enclave (e.g., due to an interruption, due to an exception, etc.). As an example, an enclave exit event may be referred to as an asynchronous exit event (AEX). For instance, an AEX may transfer control from the enclave to the application from an arbitrary point within the enclave.

In one or more embodiments, a change to one or more of an operating system enclave driver, an enclave creation application programming interface (API) within the enclave software development kit (SDK) API, and information handling system firmware may be implemented. For example, an attribute (e.g., ENCLS[ECREATE]) may be added to a user space execution environment API, which may be utilized when setting up and/or configuring an initial enclave creation environment and/or reserving an enclave region. For instance, along with a base address of the enclave and a size of the enclave, the API may pass the setup/configuration and an EFR value to notify an operating system driver that the application requested for enclave redundancy. In one or more embodiments, an operating system enclave driver may read a logical address space allocated for enclaves as provided by the application for enclave creation. The operating system enclave driver may fetch one or more subroutine calls that may allocate more storage space from a memory medium.

In one or more embodiments, one or more systems, one or more methods, and/or one or more processes may provide a software package for one or more operating systems. The software package may include a user space daemon (USD), kernel space driver (KSD), which may be utilized with different workflows, and a user space plugin (USP), which may be utilized with a legacy application (within an enclave) to provide and/or implement enclave specific calls.

In one or more embodiments, information handling system firmware may indicate that an enclave creation request may include an additional attribute. In one or more embodiments, the USD may provide a flag for a user (e.g., an administrator) to tag an application to use enclaves. When an application is selected, the USD may fetch a virtual address space utilized by the tagged application (such as a starting address, an ending address, an offset, a size, etc.) and may pass the virtual address space to the custom driver via a subroutine (e.g., a copy_from_user( ) API). In one or more embodiments, a process and/or a method may retrieve a virtual address space of an application and an application identification (ID) associated with the application.

In one or more embodiments, the USD may interface with the KSD utilizing a custom device control subroutine call (e.g., a custom parameter to ioctl(2)). In one example, the USD, utilizing the custom device control subroutine call, may provide information to a NUMA node that is executing the application. For instance, the KSD may receive, via the custom device control subroutine call, a request that includes information, which may include a base address, an offset, a length, etc. along with NUMA node data. In one or more embodiments, the KSD may define and/or implement the custom device control subroutine call. For example, the KSD may include a callback subroutine that may be called when the USD invokes the custom device control subroutine call. For instance, the KSD may include a callback subroutine that may be called when the USD invokes an ioctl subroutine call. In one or more embodiments, the callback subroutine may call an enclave create subroutine, which may interface with information handling system firmware. For example, the callback subroutine may call an enclave create subroutine (e.g., a SGX_IOC_ENCLAVE_CREATE subroutine), which may interface with information handling system firmware. In one or more embodiments, the KSD, as part of an enclave create subroutine call (e.g., sgx_encl_create( )), may provide two or more additional attributes. An additional attribute may indicate that an application is a legacy application. Another attribute may include NUMA node data. For example, this may differentiate that the enclave creation call is different from a standard operating system enclave driver. For instance, the standard operating system enclave driver may be a standard or regular operating system SGX driver.

In one or more embodiments, the information handling system firmware may retrieve an enclave creation request and/or may determine that an enclave to be created is for a legacy application. In one or more embodiments, the information handling system firmware may receive the NUMA node data and/or may determine an enclave page cache (EPC) range. For example, the EPC range may be closer to a specific processor core as noted by the NUMA node data. In one or more embodiments, the information handling system firmware may initialize an EPC address range as per the information passed from the driver KSD. For example, the information handling system firmware may move a current physical address pointer to the EPC memory medium region start address and may move data stored to the EPC memory medium page that becomes encrypted utilize an associated processor.

In one or more embodiments, after the application and its associated data have been copied to the enclave, the application may be executed within the enclave. For example, the application executing within the enclave may access its associated data stored via the enclave. In one or more embodiments, information handling system firmware may update one or more mappings of physical addresses to virtual addresses such that when the memory medium pages and/or memory medium address range differs, the EPC may be adjusted automatically. In one or more embodiments, the KSD may implement one or more ECALLs and/or one or more OCALLs if the application is a distributed application that connects with other application interfaces.

As an example, a database application (e.g., a structured query language application) may not have to be recompiled with enclave capabilities to secure the database application. The USD, the KSD, and the USP may be utilized to secure the database application within an enclave. For instance, the database application may be INTEL® SGX SDK compatible when utilizing the USD, the KSD, and the USP. The USD may determine a virtual address space associated with the database application and may provide information associated with the database application (e.g., the virtual address space) to the KSD.

In one or more embodiments, the KSD may instantiate an enclave request and information handling system firmware may create a corresponding EPC memory medium region for the database application. After the enclave is created, the USP may be migrated to the enclave and may execute along with the database application. In one or more embodiments, the USP may have a one-to-one communication coupling with the KSD to parse and/or translate ECALLs that the KSD makes to the enclave and/or parse and/or translate OCALLs that the application makes. As the database application is a legacy application, communications of the database application outside the enclave may be packaged by the USP utilizing function return values. For example, when a database write command originates from an external network, the USD may compare a request type with the API list that an administrator provided for the database application and may cascade the request to the KSD along with any relevant API details. The KSD may prepare an ECALL with a specific API. The USP may receive the request, may translate the request to an ECALL, and may provide the request to the database application. In one or more embodiments, the database application may process the request as if the request occurred while the database application was executing outside the enclave. If there is a return code associated with the request, the USP may receive the return code, create an OCALL associated with the return code, and may provide the OCALL to the KSD.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, applications (APPs) 164-166, and an OS driver 168 (e.g., an operating system enclave driver). In one or more embodiments, OS driver 168 may include a SGX driver. For example, OS driver 168 may utilize one or more structures and/or one or more functionalities of INTEL® SGX to create, maintain, and/or access an enclave. In one or more embodiments, one or more of OS 162, APPs 164-166, and OS driver 168 may include processor instructions executable by processor 120. In one example, processor 120 may execute processor instructions of one or more of OS OS 162, APPs 164-166, and OS driver 168 via non-volatile memory medium 160. In another example, one or more portions of the processor instructions of the one or more of OS 162, APPs 164-166, and OS driver 168 may be transferred to volatile memory medium 150, and processor 120 may execute the one or more portions of the processor instructions of the one or more of OS 162, APPs 164-166, and OS driver 168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 2A:
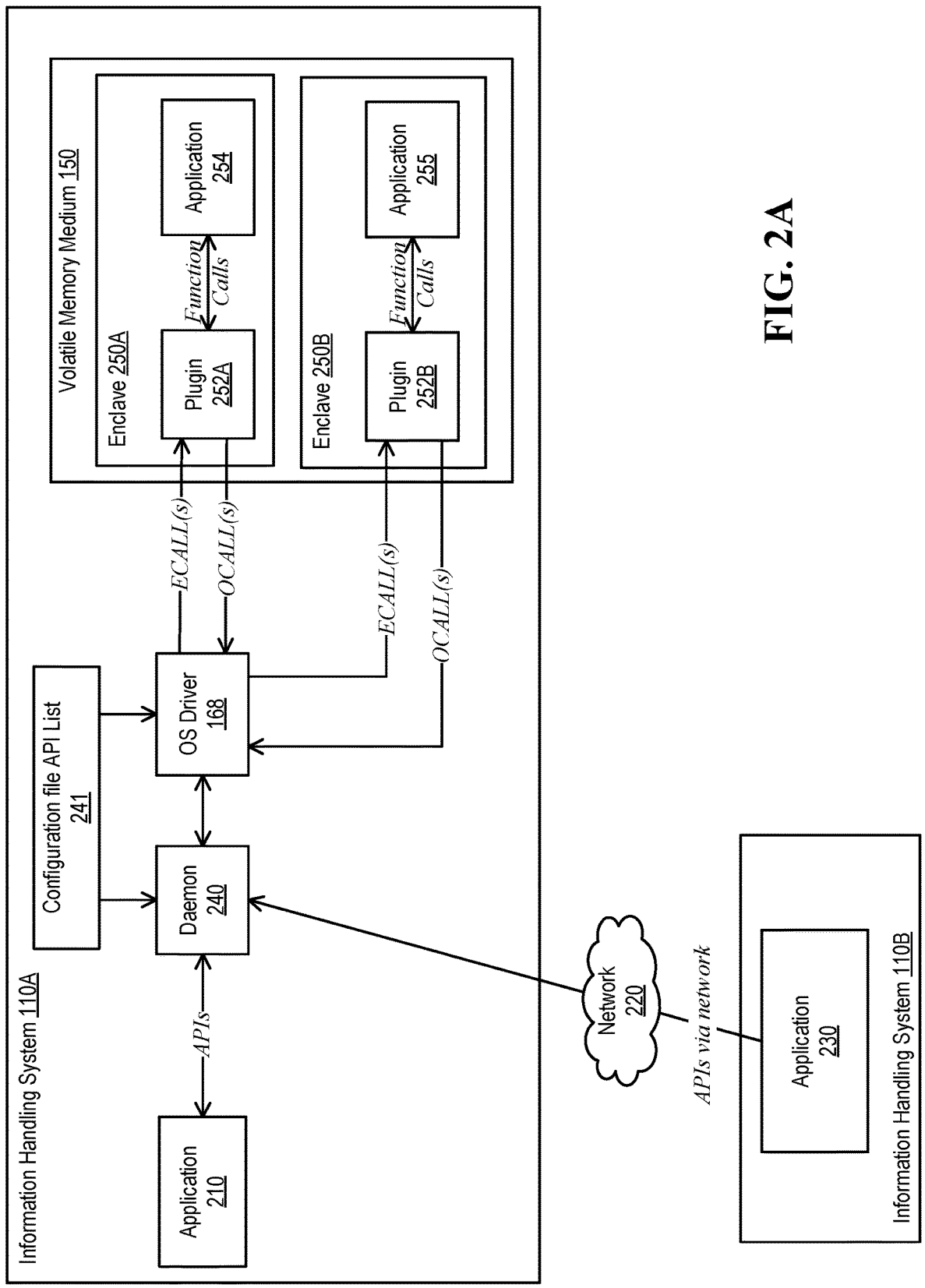
FIG. 2A illustrates an example of executing multiple applications via multiple enclaves, according to one or more embodiments.

Turning now to FIG. 2A, an example of executing multiple applications via multiple enclaves is illustrated, according to one or more embodiments. In one or more embodiments, an IHS 110A may include an application 210. For example, application 210 may be executable by processor 120 of IHS 110A. For instance, application 210 may be a "legacy" application, which may not be compiled to operate within an enclave. As an example, application 210 may not be compiled to operate within a SGX enclave.

In one or more embodiments, when a processor 120 of IHS 110A executes application 210, application 210 may call one or more APIs. For example, application 210 may call one or more subroutines of a library (e.g., a shared library). For instance, application 210 may call one or more subroutines of a library associated with an OS 162 of IHS 110A (e.g., a shared library associated with OS 162 of IHS 110A). In one or more embodiments, application 210 may be executed where the APIs may interface with a daemon 240.

For example, application 210 may be executed where application 210 may call the one or more subroutines but another library associated with OS 162 of IHS 110A (e.g., another shared library associated with OS 162 of IHS 110A) may provide implementations of the one or more subroutines. For instance, the other shared library associated with OS 162 of IHS 110A may interface with daemon 240. In one or more embodiments, daemon 240 may include a background application and/or a background process.

In one or more embodiments, an IHS 110B may include an application 230. For example, application 230 may be executable by processor 120 of IHS 110B. For instance, application 230 may be a "legacy" application, which may not be compiled to operate within an enclave. As an example, application 230 may not be compiled to operate within a SGX enclave. In one or more embodiments, when a processor 120 of IHS 110B executes application 230, application 230 may call one or more APIs. For example, application 230 may call one or more subroutines of a library (e.g., a shared library). For instance, application 230 may call one or more APIs via a network 220. In one or more embodiments, the APIs may interface with daemon 240 via network 220.

In one or more embodiments, when processor 120 of IHS 110B executes application 230, application 230 may call one or more APIs. For example, application 230 may call one or more subroutines of a library (e.g., a shared library). For instance, application 230 may call one or more subroutines of a library associated with an OS 162 of IHS 110B (e.g., a shared library associated with OS 162 of IHS 110B). In one or more embodiments, application 230 may be executed where application 230 may call the one or more subroutines but another library associated with OS 162 of IHS 110B (e.g., another shared library associated with OS 162 of IHS 110B) may provide implementations of the one or more subroutines. For instance, the other shared library associated with OS 162 of IHS 110B may interface with daemon 240 via network 220.

In one or more embodiments, information handling systems (IHSs) 110A and 110B may be coupled to network 220. Although not specifically illustrated, a network interface 180 of an IHS 110 may be coupled to network 220, for example. In one or more embodiments, network 220 may include a wired network, a wireless network, an optical network, or a combination of the foregoing, among others. For example, network 220 may include and/or be coupled to various types of communications networks. For instance, network 220 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

In one or more embodiments, daemon 240 may communicate with OS driver 168. In one or more embodiments, one or more of daemon 240 and OS driver 168, among others, may utilize a configuration file API list 241. For example, one or more of daemon 240 and OS driver 168, among others, may retrieve an API list from configuration file API list 241. In one or more embodiments, an enclave 250A may be created. For example, OS driver 168 may create enclave 250A. For instance, enclave 250A may be allocated in volatile memory medium 150.

In one or more embodiments, creating enclave 250A may include OS driver 168 communicating with IHSFW 172. For example, OS driver 168 may provide a request to IHSFW 172 to create enclave 250A. For instance, IHSFW 172 may create enclave 250A. In one or more embodiments, an enclave 250B may be created. For example, OS driver 168 may create enclave 250B. For instance, enclave 250B may be allocated in volatile memory medium 150. In one or more embodiments, creating enclave 250B may include OS driver 168 communicating with IHSFW 172. For example, OS driver 168 may provide a request to IHSFW 172 to create enclave 250B. For instance, IHSFW 172 may create enclave 250B.

In one or more embodiments, OS driver 168 and IHSFW 172 may communicate via a management information exchange. For example, OS driver 168 and IHSFW 172 may communicate via one or more of a WMI and a CIM, among others. For instance, OS driver 168 may provide a request to IHSFW 172 to create enclave 250 via one or more of the WMI and the CIM, among others.

In one or more embodiments, a plugin 252A may be stored in enclave 250A. In one or more embodiments, application 210 may be transferred to enclave 250A. For example, application 210 may become an application 254, which may be stored via enclave 250A. In one or more embodiments, application 254 may communicate with plugin 252. For example, application 254 may communicate with plugin 252 via function calls (e.g., subroutine calls). In one or more embodiments, plugin 252A may include one or more functions and/or one or more structures of a secure application and/or a secure library. For example, plugin 252A may include one or more functions and/or one or more structures of a SGX application and/or a SGX library. In one instance, plugin 252A may make one or more OCALLs on behalf of application 254 based at least on communications with application 254. In another instance, plugin 252A may receive one or more ECALLs on behalf of application 254 and provide information to application 254 based at least on the one or more ECALLs.

In one or more embodiments, a plugin 252B may be stored in enclave 250B. In one or more embodiments, application 230 may be transferred to enclave 250B. For example, application 230 may become an application 255, which may be stored via enclave 250B. In one or more embodiments, application 255 may communicate with plugin 252B. For example, application 255 may communicate with plugin 252B via function calls (e.g., subroutine calls). In one or more embodiments, plugin 252B may include one or more functions and/or one or more structures of a secure application and/or a secure library. For example, plugin 252B may include one or more functions and/or one or more structures of a SGX application and/or a SGX library. In one instance, plugin 252B may make one or more OCALLs on behalf of application 255 based at least on communications with application 255. In another instance, plugin 252B may receive one or more ECALLs on behalf of application 255 and provide information to application 255 based at least on the one or more ECALLs.

Figure 2B:
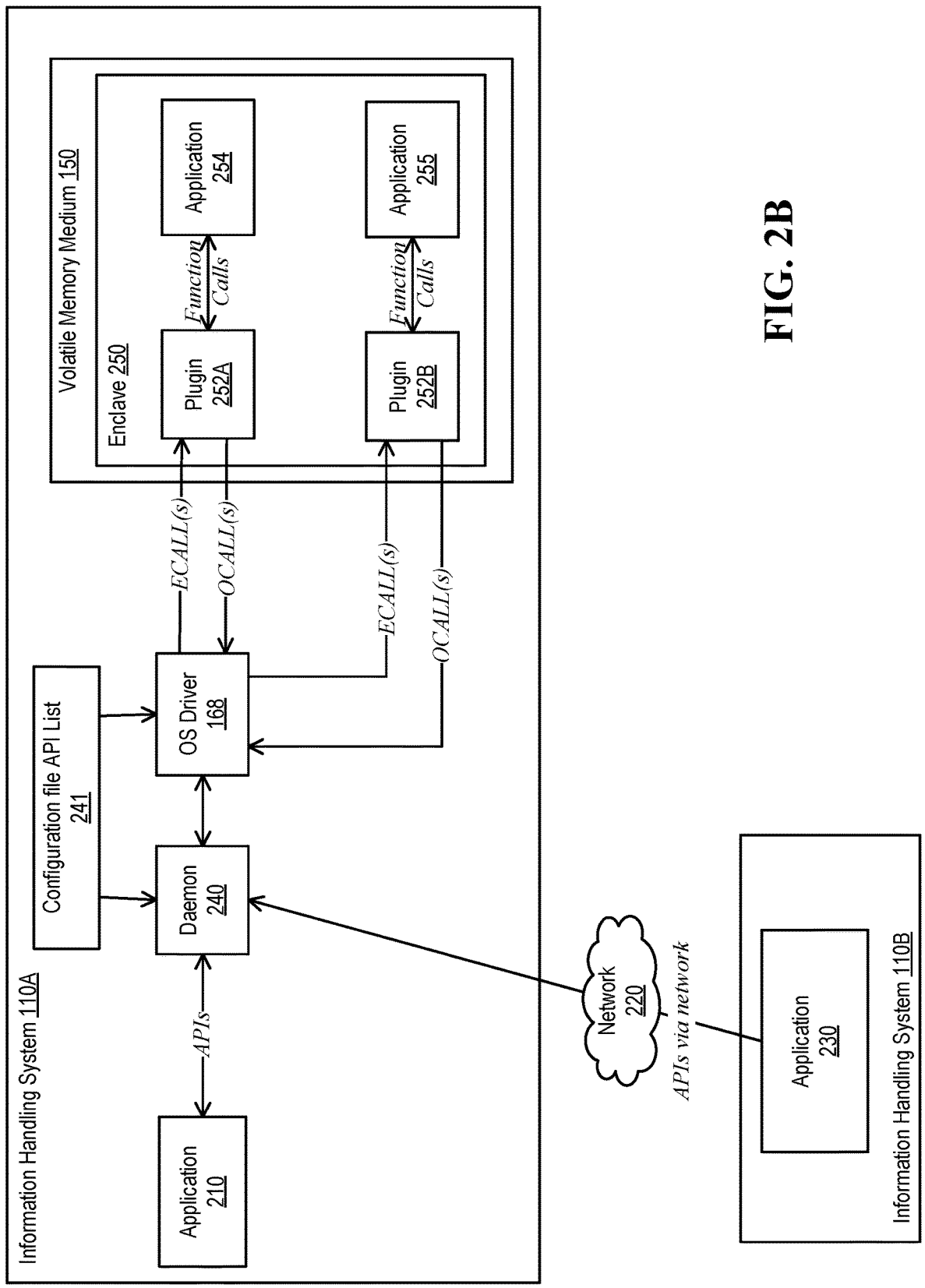
FIG. 2B illustrates an example of executing multiple applications via a single enclave, according to one or more embodiments.

Turning now to FIG. 2B, an example of executing multiple applications via a single enclave is illustrated, according to one or more embodiments. In one or more embodiments, a single enclave 250 may be allocated in volatile memory medium 150. For example, enclave 250 may store plugins 252A and 252B and may store applications 254 and 255.

Figure 3A:
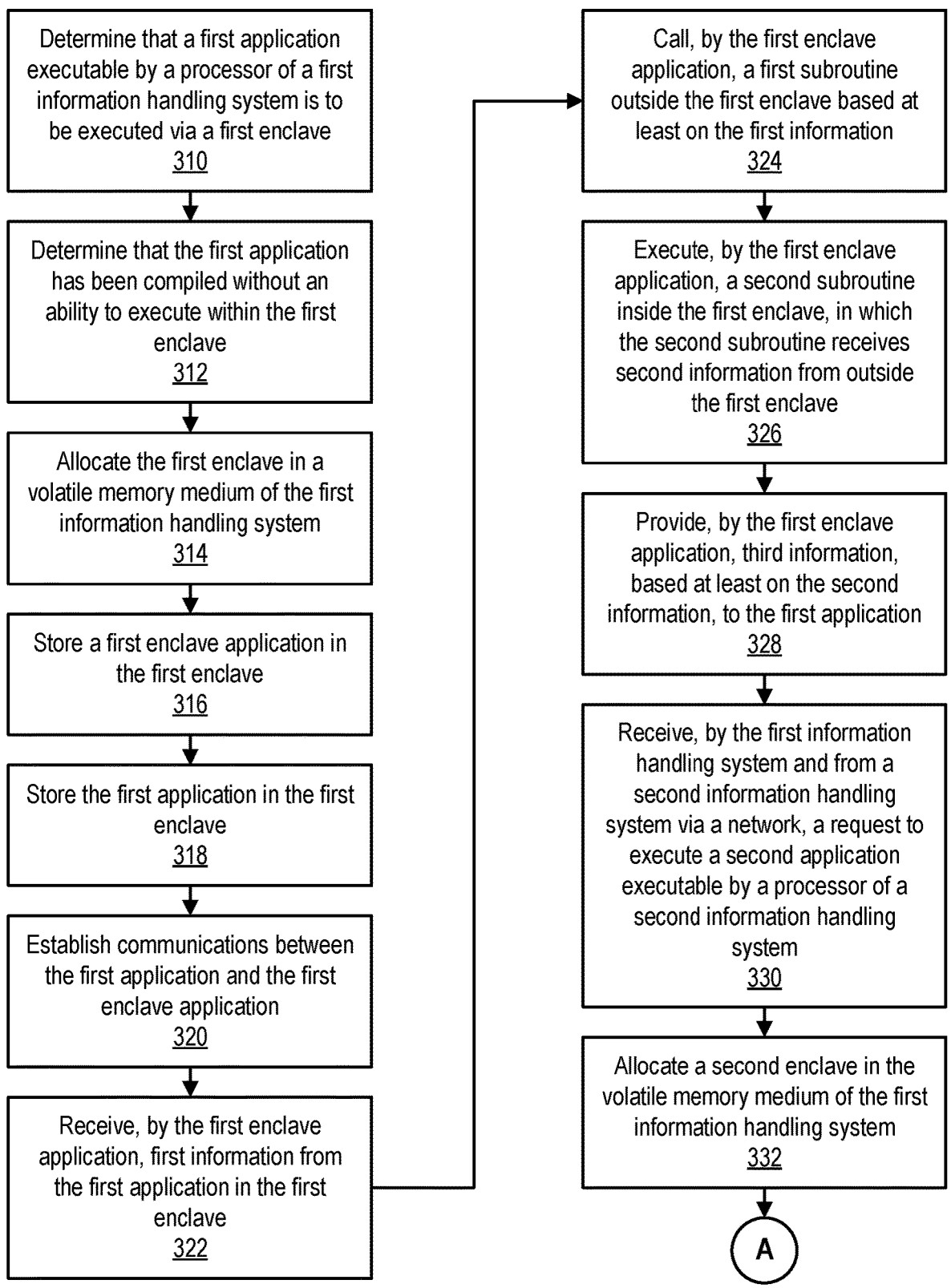
FIGS. 3A and 3B illustrate an example of a method of operating an information handling system, according to one or more embodiments.
Figure 3B:
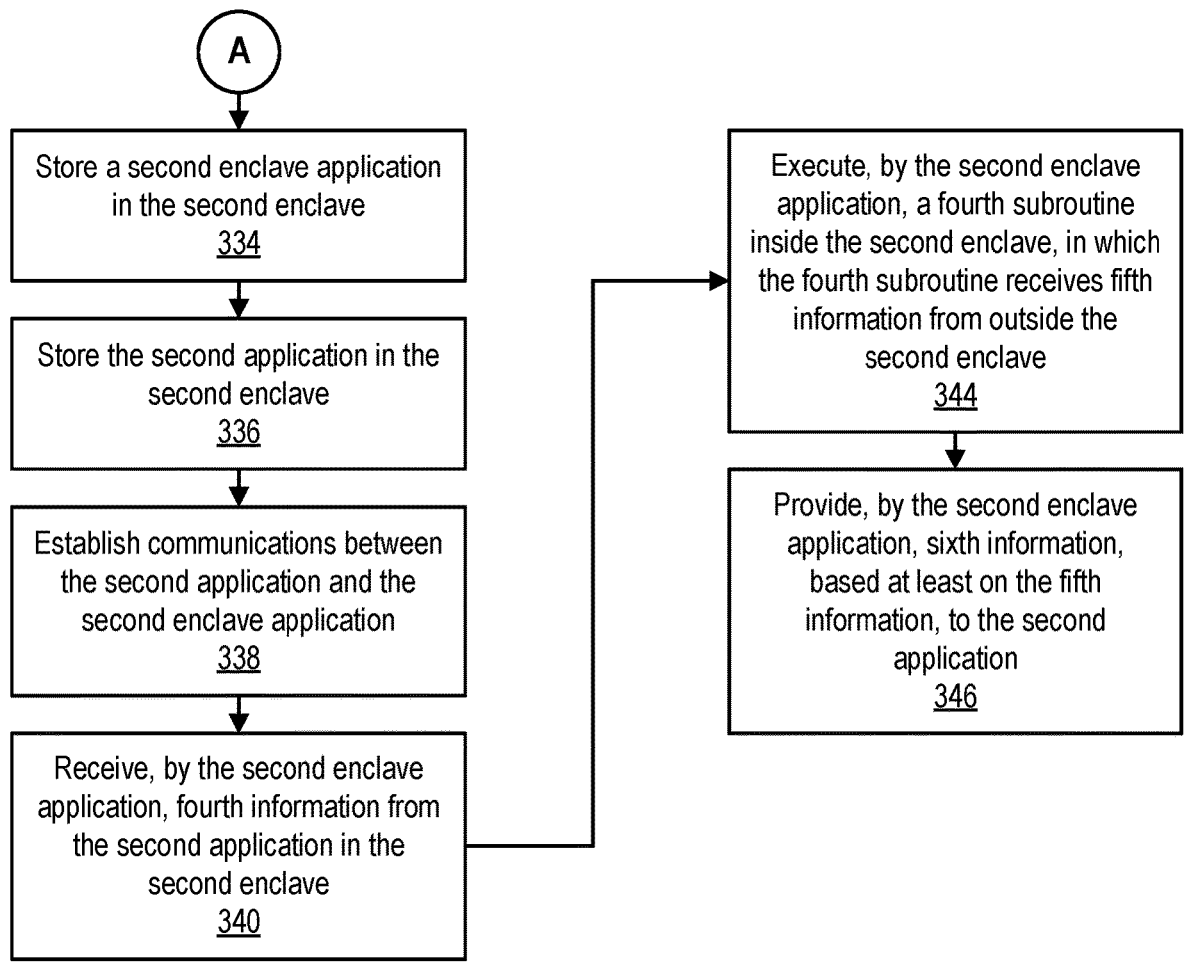
Figure 4:
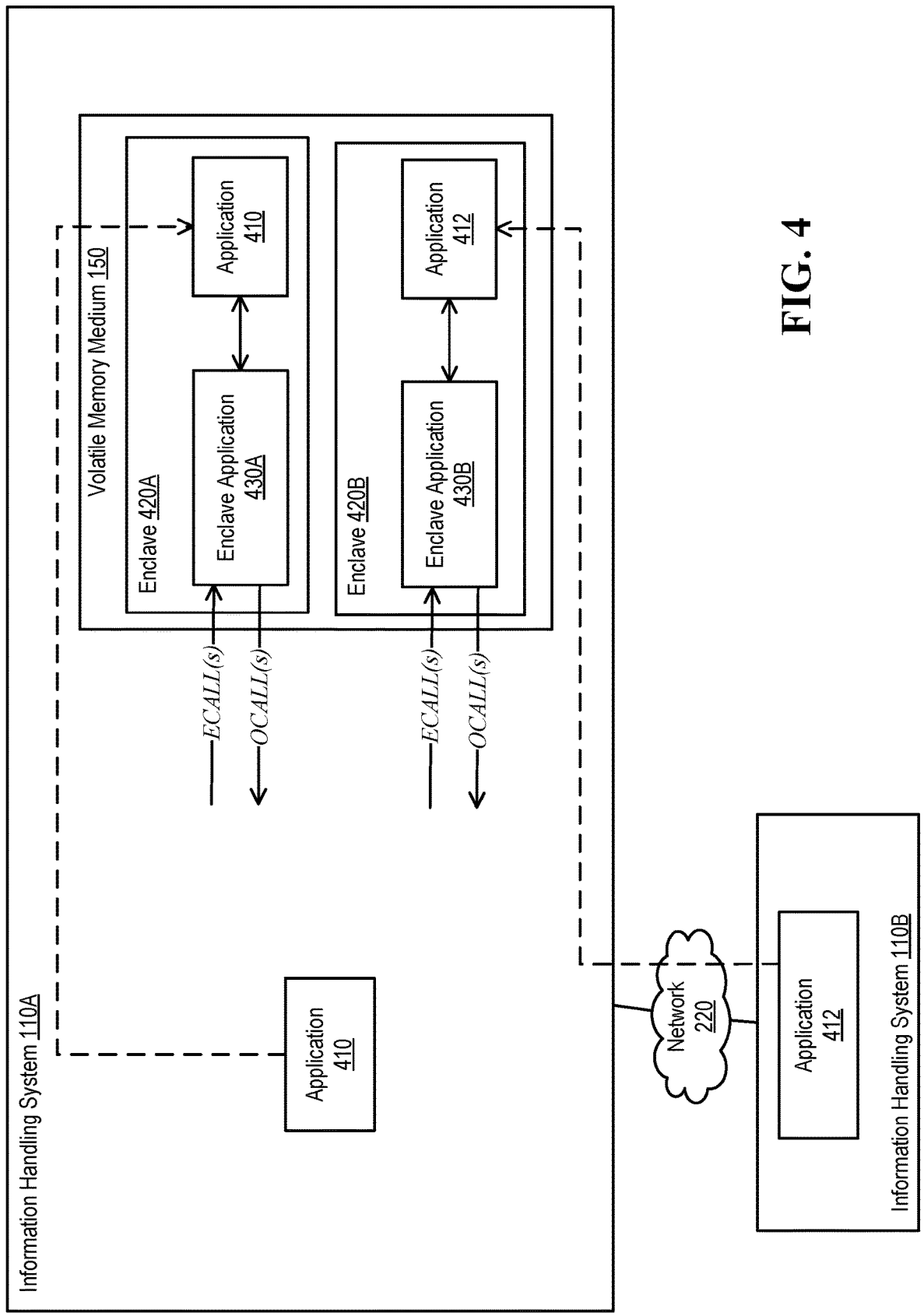
FIG. 4 illustrates another example of executing multiple applications via multiple enclaves, according to one or more embodiments.

Turning now to FIGS. 3A and 3B, an example of a method of operating an information handling system is illustrated, according to one or more embodiments. At 310, it may be determined that a first application executable by a processor of a first information handling system is to be executed via a first enclave. For example, it may be determined that an application 410 executable by a processor of IHS 110A, illustrated in FIG. 4, is to be executed via an enclave 420A.

At 312, it may be determined that the first application has been compiled without an ability to execute within the first enclave. For example, it may be determined that the first application lacks an ability to execute within the first enclave without assistance. For instance, it may be determined that the first application lacks an ability to execute within the first enclave without assistance from a first enclave application. In one or more embodiments, it may be determined that application 410 has been compiled without an ability to execute within enclave 420A, shown in FIG. 4. For example, it may be determined that application 410 lacks an ability to execute within enclave 420A without assistance. For instance, it may be determined that application 410 lacks an ability to execute within enclave 420A without assistance from an enclave application 430A, illustrated in FIG. 4.

At 314, the first enclave may be allocated in a volatile memory medium of the first information handling system. For example, as shown in FIG. 4, enclave 420A may be allocated in volatile memory medium 150 of IHS 110A. At 316, a first enclave application may be stored in the first enclave. For example, as illustrated in FIG. 4, enclave application 430A may be stored in enclave 420A. At 318, the first application may be stored in the first enclave. For example, as shown in FIG. 4, application 410 may be stored in enclave 420A.

At 320, communications may be established between the first application and the first enclave application. For example, communications may be established between application 410 and enclave application 430A. At 322, first information from the first application in the first enclave may be received by the first enclave application. For example, first information from application 410 in enclave 420A may be received by enclave application 430A. As an example, processor 120 of IHS 110A may execute application 410 in enclave 420A. For instance, first information from application 410 in enclave 420A may be received by enclave application 430A, which may be executed by processor 120 of IHS 110A.

At 324, a first subroutine outside the first enclave may be called based at least on the first information. For example, at least a portion of the first information may be passed to the first subroutine. In one or more embodiments, the first subroutine outside the first enclave may associated with an operating system executing on the first information handling system. For example, a driver of the operating system executing on the first information handling system may include the first subroutine. For instance, an OS driver 168 of IHS 110A may include the first subroutine.

At 326, a second subroutine inside the first enclave may be executed by the first enclave application, in which the second subroutine receives second information from outside the first enclave. For example, the first enclave application may include the second subroutine. For instance, enclave application 430A may include the second subroutine. At 328, third information, based at least on the second information, may be provided to the first application by the first enclave application. For example, third information, based at least on the second information, may be provided to application 410 by enclave application 420A. In one or more embodiments, the third information may include at least a portion of the second information.

At 330, a request to execute a second application executable by a processor of a second information handling system may be received by the first information handling system and from the second information handling system via a network. For example, as illustrated in FIG. 4, IHS 110A may receive, via network 220, a request to execute an application 412 executable by a processor of IHS 110B. In one or more embodiments, it may be determined that the second application has been compiled without an ability to execute within the second enclave. For example, it may be determined that the second application lacks an ability to execute within the second enclave without assistance. For instance, it may be determined that the second application lacks an ability to execute within the second enclave without assistance from a second enclave application. In one or more embodiments, it may be determined that application 412 has been compiled without an ability to execute within enclave 420B. For example, it may be determined that application 412 lacks an ability to execute within enclave 420B without assistance. For instance, it may be determined that application 412 lacks an ability to execute within application 412 without assistance from an enclave application 430B.

At 332, a second enclave may be allocated in the volatile memory medium of the first information handling system. For example, as shown in FIG. 4, enclave 420B may be allocated in volatile memory medium 150. At 334, the second enclave application may be stored in the second enclave. For example, as shown in FIG. 4, enclave application 430B may be stored in enclave 420B. At 336, the second application may be stored in the second enclave. For example, as illustrated in FIG. 4, application 412 may be stored in enclave 420B. In one or more embodiments, IHS 110A may receive application 412 from IHS 110B via network 220.

At 338, communications may be established between the second application and the second enclave application. For example, communications may be established between application 412 and enclave application 430B. At 340, fourth information may be received by the second enclave application from the second application in the second enclave. For example, fourth information from application 412 in enclave 420B may be received by enclave application 430B. As an example, processor 120 of IHS 110A may execute application 412 in enclave 420B. For instance, fourth information from application 412 in enclave 420B may be received by enclave application 430B, which may be executed by processor 120 of IHS 110A.

At 342, a third subroutine outside the second enclave may be called by the second enclave application based at least on the fourth information. At 344, a fourth subroutine inside the second enclave may be executed by the second enclave application, in which the fourth subroutine receives fifth information from outside the second enclave. For example, the second enclave application may include the fourth subroutine. At 46, sixth information may be provided by the second enclave application to the second application based at least on the fifth information, to the second application.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
at least one processor; and
a memory medium, coupled to the at least one processor, that stores instructions executable by the at least one processor, which when executed by the at least one processor, cause the information handling system to:
determine that a first database application, executable by the at least one processor, is to be executed via a first enclave;
determine that the first database application has been compiled without an ability to execute within the first enclave;
allocate the first enclave in a volatile memory medium of the information handling system;
migrate a first user space plugin (USP) enclave application to the first enclave;
store a first enclave application in the first enclave;
store the first database application in the first enclave;
establish communications between the first application and the first enclave application;
receive, by the first USP, a request to perform a command by the first database application that is originated from an external network;
translate, by the first USP, the request to an enclave call;
provide, by the first USP, the enclave call to the first application;
process, by the first database application in the first enclave, the request based on the enclave call, wherein the first database application processes the request in a same manner as were the first database application located outside of the first enclave;
receive, by the first enclave application, first information from the first database application in the first enclave based on processing of the request;
call, by the first enclave application, a first subroutine outside the first enclave based at least on the first information;
execute, by the first enclave application, a second subroutine inside the first enclave, wherein the second subroutine receives second information from outside the first enclave; and
provide, by the first enclave application, third information, based at least on the second information, to the first database application.

2. The information handling system of claim 1, wherein the instructions further cause the information handling system to:
receive, by the information handling system and from another information handling system via a network, a request to execute a second application executable by a processor of the other information handling system;
allocate a second enclave in the volatile memory medium of the information handling system;
store a second enclave application in the second enclave;
store the second application in the second enclave;
establish communications between the second application and the second enclave application;
receive, by the second enclave application, fourth information from the second application in the second enclave;
call, by the second enclave application, a third subroutine outside the second enclave based at least on the fourth information;
execute, by the second enclave application, a fourth subroutine inside the second enclave, wherein the fourth subroutine receives fifth information from outside the second enclave; and
provide, by the second enclave application, sixth information, based at least on the fifth information, to the second application.

3. The information handling system of claim 2, wherein the second enclave is different from the first enclave.

4. The information handling system of claim 2, wherein the instructions further cause the information handling system to:
determine that the second application has been compiled without an ability to execute within the second enclave.

5. The information handling system of claim 1, wherein the first subroutine outside the first enclave is associated with an operating system executing on the information handling system.

6. The information handling system of claim 5, wherein a driver of the operating system includes the first subroutine.

7. The information handling system of claim 1, wherein the third information includes at least a portion of the second information.

8. A method, comprising:
determining that a first database application executable by a processor of a first information handling system is to be executed via a first enclave;
determining that the first database application has been compiled without an ability to execute within the first enclave;
allocating the first enclave in a volatile memory medium of the first information handling system;
migrating a first user space plugin (USP) enclave application to the first enclave;
storing a first enclave application in the first enclave;
storing the first database application in the first enclave;
establishing communications between the first application and the first enclave application;
receiving, by the first USP, a request to perform a command by the first database application that is originated from an external network;
translating, by the first USP, the request to an enclave call;
providing, by the first USP, the enclave call to the first application;
processing, by the first database application in the first enclave, the request based on the enclave call, wherein the first database application processes the request in a same manner as were the first database application located outside of the first enclave;
receiving, by the first enclave application, first information from the first database application in the first enclave based on processing the request;

calling, by the first enclave application, a first subroutine outside the first enclave based at least on the first information;

executing, by the first enclave application, a second subroutine inside the first enclave, wherein the second subroutine receives second information from outside the first enclave; and providing, by the first enclave application, third information, based at least on the second information, to the first database application.

9. The method of claim 8, further comprising:

receiving, by the first information handling system and from a second information handling system via a network, a request to execute a second application executable by a processor of a second information handling system;

allocating a second enclave in the volatile memory medium of the first information handling system;

storing a second enclave application in the second enclave;

storing the second application in the second enclave;

establishing communications between the second application and the second enclave application;

receiving, by the second enclave application, fourth information from the second application in the second enclave;

calling, by the second enclave application, a third subroutine outside the second enclave based at least on the fourth information;

executing, by the second enclave application, a fourth subroutine inside the second enclave, wherein the fourth subroutine receives fifth information from outside the second enclave; and providing, by the second enclave application, sixth information, based at least on the fifth information, to the second application.

10. The method of claim 9, wherein the second enclave is different from the first enclave.

11. The method of claim 9, further comprising:
determining that the second application has been compiled without an ability to execute within the second enclave.

12. The method of claim 8, wherein the first subroutine outside the first enclave is associated with an operating system executing on the first information handling system.

13. The method of claim 12, wherein a driver of the operating system includes the first subroutine.

14. The method of claim 8, wherein the third information includes at least a portion of the second information.

15. A computer-readable non-transitory memory medium that includes instructions that, when executed by at least one processor of an information handling system, cause the information handling system to:

determine that a first database application, executable by the at least one processor, is to be executed via a first enclave;

determine that the first database application has been compiled without an ability to execute within the first enclave;

allocate the first enclave in a volatile memory medium of the information handling system;

migrate a first user space plugin (USP) enclave application to the first enclave;

store a first enclave application in the first enclave;

store the first database application in the first enclave;

establish communications between the first application and the first enclave application;

receive, by the first USP, a request to perform a command by the first database application that is originated from an external network;

translate, by the first USP, the request to an enclave call;

provide, by the first USP, the enclave call to the first application;

process, by the first database application in the first enclave, the request based on the enclave call, wherein the first database application processes the request in a same manner as were the first database application located outside of the first enclave;

receive, by the first enclave application, first information from the first database application in the first enclave based on processing of the request;

call, by the first enclave application, a first subroutine outside the first enclave based at least on the first information;

execute, by the first enclave application, a second subroutine inside the first enclave, wherein the second subroutine receives second information from outside the first enclave; and provide, by the first enclave application, third information, based at least on the second information, to the first database application.

16. The computer-readable non-transitory memory medium of claim 15, wherein the instructions further cause the information handling system to:

receive, by the information handling system and from another information handling system via a network, a request to execute a second application executable by a processor of the other information handling system;

allocate a second enclave in the volatile memory medium of the information handling system;

store a second enclave application in the second enclave;

store the second application in the second enclave;

establish communications between the second application and the second enclave application;

receive, by the second enclave application, fourth information from the second application in the second enclave;

call, by the second enclave application, a third subroutine outside the second enclave based at least on the fourth information;

execute, by the second enclave application, a fourth subroutine inside the second enclave, wherein the fourth subroutine receives fifth information from outside the second enclave; and provide, by the second enclave application, sixth information, based at least on the fifth information, to the second application.

17. The computer-readable non-transitory memory medium of claim 16, wherein the second enclave is different from the first enclave.

18. The computer-readable non-transitory memory medium of claim 16, wherein the instructions further cause the information handling system to:

determine that the second application has been compiled without an ability to execute within the second enclave.

19. The computer-readable non-transitory memory medium of claim 15, wherein the first subroutine outside the first enclave is associated with an operating system executing on the information handling system.

20. The computer-readable non-transitory memory medium of claim 19, wherein a driver of the operating system includes the first subroutine.

* * * * *